(12) United States Patent
Ross et al.

(10) Patent No.: US 10,920,970 B2
(45) Date of Patent: *Feb. 16, 2021

(54) SUSPENDED LIGHTGUIDE LUMINAIRE WITH LINEAR SOUND BAFFLES

(71) Applicant: Signify Holding B.V., Eindhoven (NL)

(72) Inventors: Alexander James Ross, Aurora, CO (US); Sohana Arni, Aurora, CO (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,124

(22) Filed: Mar. 11, 2020

(65) Prior Publication Data

US 2020/0208811 A1    Jul. 2, 2020

Related U.S. Application Data

(63) Continuation of application No. 16/405,850, filed on May 7, 2019, now Pat. No. 10,598,355.

(60) Provisional application No. 62/668,111, filed on May 7, 2018.

(51) Int. Cl.
| | |
|---|---|
| *F21V 21/03* | (2006.01) |
| *E04B 1/84* | (2006.01) |
| *F21V 7/10* | (2006.01) |
| *F21V 8/00* | (2006.01) |

(52) U.S. Cl.
CPC ............. *F21V 21/03* (2013.01); *E04B 1/84* (2013.01); *F21V 7/10* (2013.01); *G02B 6/0073* (2013.01)

(58) Field of Classification Search
CPC ...... F21Y 2115/10; E04B 1/82; E04B 1/8209; E04B 1/8218; E04B 1/8227; E04B 1/8236; E04B 1/8245; E04B 1/8254; E04B 1/8263; E04B 1/8272; E04B 1/8281; E04B 1/829; E04B 9/001
See application file for complete search history.

(56) References Cited

U.S. PATENT DOCUMENTS

| | | |
|---|---|---|
| D147,905 S | 11/1947 | Holmes |
| 2,886,697 A | 5/1959 | Pomeroy |
| D459,827 S | 7/2002 | Yang |
| 8,967,823 B2 | 3/2015 | D'Antonio |
| D742,575 S | 11/2015 | Blum |

(Continued)

FOREIGN PATENT DOCUMENTS

| | | |
|---|---|---|
| DE | 102008026504 | 12/2009 |
| EP | 2813630 | 12/2014 |
| WO | WO 2013/050908 | 4/2013 |

OTHER PUBLICATIONS

Product Data Sheet for Wavelike Baffle Ceiling No. LMD-L LAOLA, by Lindner dated Jun. 26, 2018. (Year: 2018).

(Continued)

*Primary Examiner* — Robert J May
(74) *Attorney, Agent, or Firm* — Patrick T. Driscoll (57) ABSTRACT

A luminaire includes a light module, the light module including a first acoustic panel, a second acoustic panel, and a lightguide disposed between the first acoustic panel and the second acoustic panel. The lightguide can extend from the first acoustic panel and the second acoustic panel. A frame is disposed between the first acoustic panel and the second acoustic panel and secures an edge of the lightguide within the light module. A light emitting diode is located within the frame and oriented to emit light into the edge of the lightguide.

20 Claims, 5 Drawing Sheets

(56) References Cited

U.S. PATENT DOCUMENTS

| | | |
|---|---|---|
| D743,611 S | 11/2015 | Wouters |
| 9,194,124 B2 | 11/2015 | Johnson |
| D762,911 S | 8/2016 | Blum |
| D792,004 S | 7/2017 | Sonneman |
| 9,822,938 B2 | 11/2017 | De Gier |
| D814,691 S | 4/2018 | Clark |
| D854,728 S | 7/2019 | Velez |
| 2002/0089852 A1 | 7/2002 | Casciani |
| 2014/0078756 A1 | 3/2014 | Tuttle |
| 2017/0248286 A1 | 8/2017 | Wouters |
| 2018/0334804 A1 | 11/2018 | Patterson |
| 2019/0017260 A1 | 1/2019 | Bou Harb |
| 2019/0088241 A1 | 3/2019 | Czech et al. |
| 2019/0137070 A1 | 5/2019 | Martin |

OTHER PUBLICATIONS

Linear Ceiling Baffles, Part No. TA-0018 by TECHLITE 2019. (Year: 2019).
System for Luminaires for Metal Ceilings, shown installed at the BASF Ludwigshafen Building D 105, Germany, Photo Stefan Schiling. From www.linder-group.com visited Aug. 13, 2019. (Year 2019).
White PVC 3D Wall Panels Wave Wall Design by Art3d, Model #A10002. From <homedepot.com> visited Aug. 13, 2019 (year 2019).
Lightart.com; Slim Beams; LA2 Specifications; Aug. 30, 2018.
Lightart.com; Static; Acoustic static Overview; Apr. 20, 2019.
International Search Report for PCT/EP2019/025141, dated Jun. 25, 2019.
Accoustic Solutions. https://www.focalpointlights.com/acousticsolutions Retrieved Jun. 20, 2019. pp. 1-6.

SUSPENDED LIGHTGUIDE LUMINAIRE WITH LINEAR SOUND BAFFLES

RELATED APPLICATIONS

The present application is a continuation application of and claims priority to U.S. Non-Provisional patent application Ser. No. 16/405,850 filed on May 7, 2019 and titled "Suspended Lightguide Luminaire With Linear Sound Baffles," which claims priority to U.S. Provisional Patent Application No. 62/668,111 filed May 7, 2018 and titled "Suspended Lightguide Luminaire With Linear Sound Baffles". The entire content of the foregoing applications is incorporated herein by reference.

TECHNICAL FIELD

Embodiments of the technology relate generally to illumination systems and more particularly to a suspended lightguide luminaire that provides sound dampening.

BACKGROUND

As compared to incandescent and fluorescent light sources, light emitting diodes (LEDs) offer substantial potential benefit associated with their energy efficiency, light quality, and compact size. However, applying LEDs for use in lighting systems offers both challenges and opportunities. As one example, LEDs can be used in edge-lit solutions where light from the LEDs is directed into a panel of optical material in order to distribute the light for illuminating an area. These types of edge-lit lighting systems provide a variety of opportunities for illuminating an area and for offering other features and benefits.

SUMMARY

In one example embodiment, the present disclosure provides a luminaire comprising a light module. The light module comprises a first acoustic panel having a first wide portion and a first narrow portion. The light module further comprises a second acoustic panel having a second wide portion and a second narrow portion. The light module further comprises a lightguide located between the first acoustic panel and the second acoustic panel, the lightguide extending from the first acoustic panel adjacent the first narrow portion and extending from the second acoustic panel adjacent the second narrow portion. A frame disposed between the first acoustic panel and the second acoustic panel secures an edge of the lightguide within the light module. One or more LEDs are located within the frame and adjacent the edge of the lightguide, oriented to emit light into the lightguide. The luminaire can comprise a single light module or multiple light modules that are joined together by a rail. The first acoustic panel and the second acoustic panel can be made from sound absorbing materials. Alternatively, the first acoustic panel and the second acoustic panel can have sound absorbing materials or sound absorbing features attached to the outside surfaces of the panels.

In another example embodiment, the present disclosure provides a luminaire comprising a light module. The light module comprises an acoustic panel housing having a slot. A lightguide is located in the slot and extends from the acoustic panel housing. A frame disposed within the acoustic panel housing secures an edge of the lightguide within the acoustic panel housing. One or more LEDs are located within the frame and adjacent the edge of the lightguide, wherein the one or more LEDs oriented to emit light into the edge of the lightguide. The luminaire can comprise a single light module or multiple light modules that are joined together by a rail. The acoustic panel housing can be made from sound absorbing materials. Alternatively, the acoustic panel housing can have sound absorbing materials or sound absorbing features attached to the outside surfaces of the acoustic panel housing.

These and other aspects and embodiments will be apparent from the following disclosure and claims and the appended drawings.

BRIEF DESCRIPTION OF THE FIGURES

Reference will be made below to the accompanying drawings.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positions may be exaggerated to help visually convey certain principles. In the drawings, similar reference numerals among different figures designate like or corresponding, but not necessarily identical, elements.

DETAILED DESCRIPTION OF EXAMPLE EMBODIMENTS

The example luminaires described herein use one or more lightguides in a luminaire that is suspended from a ceiling or other mounting structure. As will be further described, the example luminaires described herein provide additional benefits. As one example, the luminaire can be customized to accommodate one or multiple lightguides with the capacity to provide varying levels of light.

Another example benefit is that the luminaire can comprise one or more acoustic panels or features used for absorbing sound. Common open-office spaces and other volumes of space often lack mechanical features such as ceilings and walls that improve acoustic properties for occupants. Acoustic baffles and panels can be added to walls and ceilings, but the associated costs can run quite high. In addition, such acoustic baffles and panels are often not aesthetically pleasing. Luminaires provide a unique opportunity for attaching or incorporating acoustic baffles thereby eliminating the need to add acoustic baffles to walls and ceilings.

The example suspended luminaires described in this disclosure use a lightguide for transmitting light. A lightguide can comprise a panel, slab, plate, or related form that can be flat or curved and that comprises two major faces that are internally reflective. Light can be introduced into the lightguide from a first edge of the lightguide, so that the major faces guide the light towards a second edge. One or both of the major faces can have features that provide a controlled release of light flowing through the lightguide, to illuminate an area. Light can thus propagate in the lightguide via internal reflection from the two major faces, traveling from the light-source edge towards an opposing edge, and illumination light can escape from the lightguide through the major faces. A light source can be positioned adjacent the first edge of the lightguide, so that the light source emits light into the lightguide via the first edge. In alternative embodiments, additional LEDs can be located adjacent to one or more of the other edges of the lightguide thereby directing light into the lightguide from the other edges. In yet other alternative embodiments, instead of positioning LEDs adjacent to the edges of the lightguide, certain edges can have a reflector located adjacent to one or more edges of the lightguide, the reflector reflecting light exiting the edge of the lightguide back into the edge of the lightguide. In yet other alternative embodiments, certain edges can have a diffuser located adjacent to one or more edges of the lightguide, the diffuser acting to diffuse light as it exits the edge of the lightguide. LEDs are an example of the light source that can be used with the lightguide, including but not limited to discrete LEDs, arrays of LEDs, and chip-on-board LEDs. In other embodiments, alternative light sources such as organic LEDs can be used.

The example embodiments described herein can be used with any type of luminaire. While the examples illustrated in the accompanying figures are suspended luminaires, in alternate embodiments, the luminaire can be a linear light fixture, a surface mounted fixture, a troffer, an under cabinet light fixture, a table lamp, a floodlight, a spot light, an architectural light, or a high-bay fixture, as other examples. Example embodiments can be used with new luminaires or retrofitted to existing luminaires. Further, luminaires with which example embodiments can be used can be located in any environment (e.g., indoor, outdoor, high humidity, low temperature, sterile, high vibration).

Figure 1:
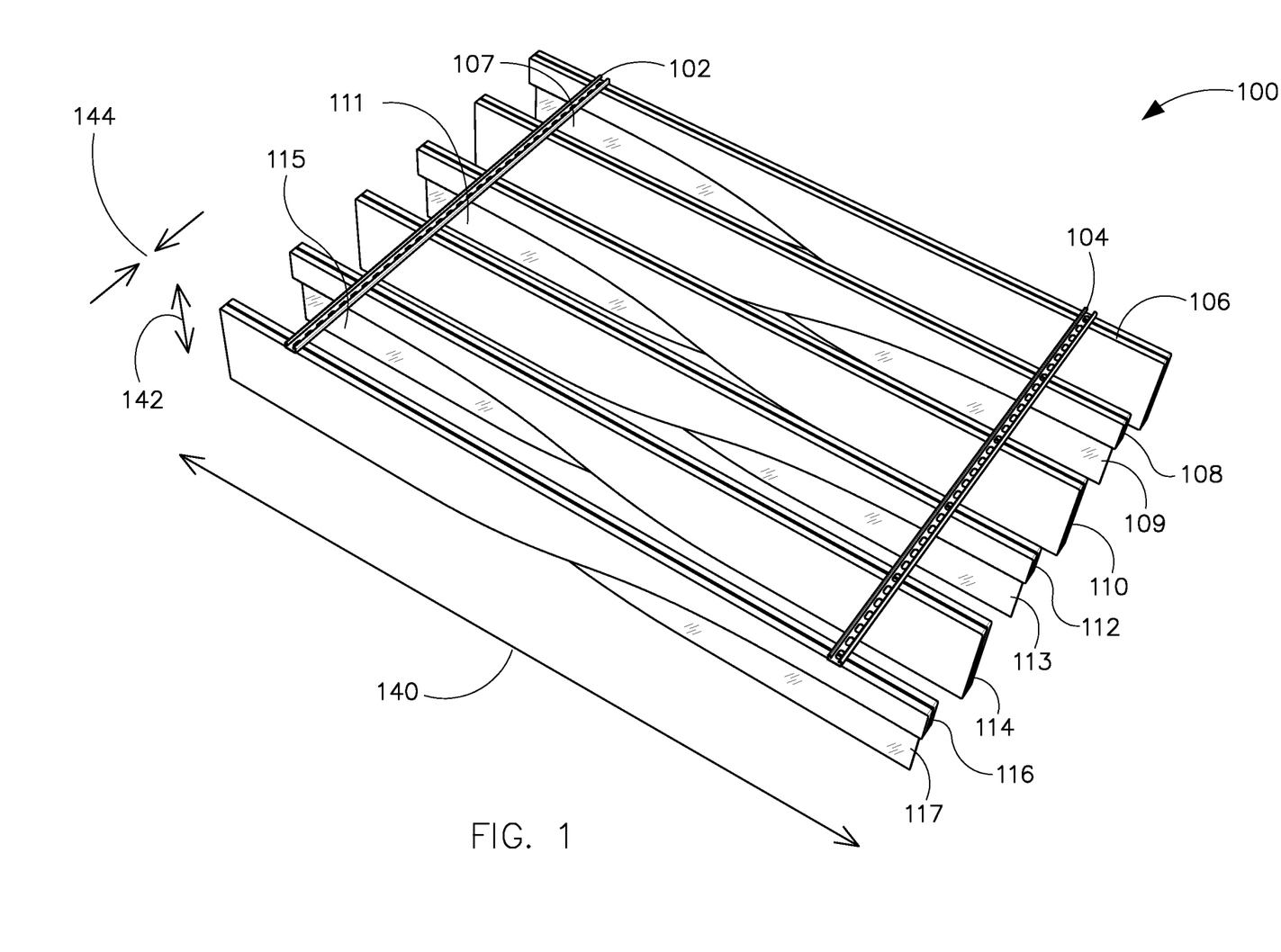
FIG. 1 is a top perspective view of a suspended luminaire in accordance with an example embodiment of the disclosure.
Figure 2:
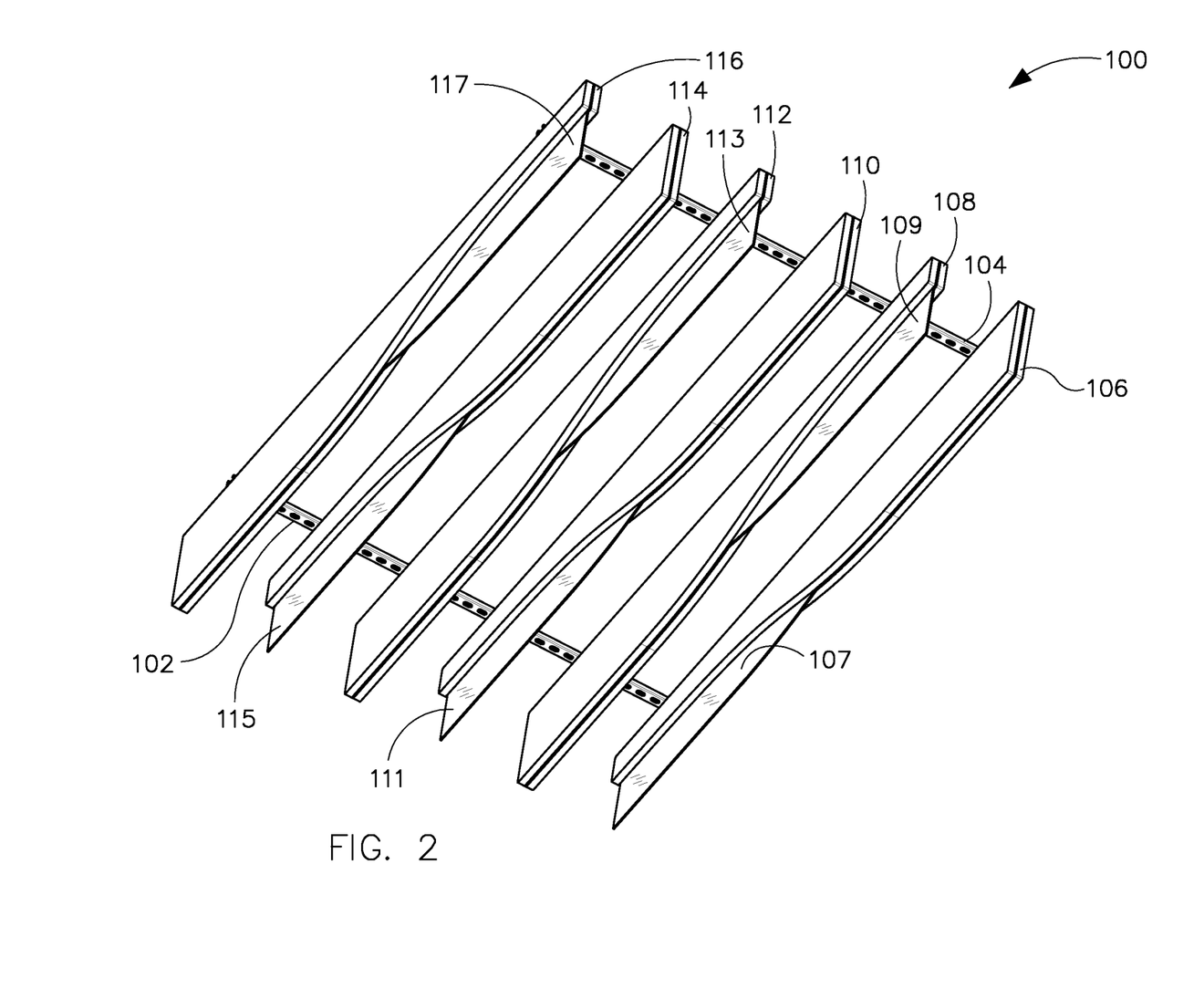
FIG. 2 is a bottom perspective view of the suspended luminaire in accordance with an example embodiment of the disclosure.

Referring now to FIGS. 1 and 2, an example suspended luminaire 100 is illustrated. The suspended luminaire 100 comprises a series of six light modules 106, 108, 110, 112, 114, and 116 attached to rails 102 and 104. The six light modules each have a respective lightguide 107, 109, 111, 113, 115, and 117 such as the lightguides described above. In the example luminaire 100, the series of six light modules are mounted to the rails so that each light module is parallel to the other light modules. The rails 102 and 104 can be attached directly with fasteners to a ceiling, a beam, or other support structure. Alternatively, cables, attachment rods, or other attaching mechanisms can connect the rails 102 and 104 to a ceiling, a beam, or other support structure. If cables are used to suspend the luminaire 100, the cables can also be used to provide power to the one or more LEDs used in the suspended luminaire 100. Once installed, the lightguides of the suspended luminaire 100 emit light to illuminate an area below the suspended luminaire 100, while the acoustic features (described below) of the luminaire 100 can absorb or reflect sound.

In one example, a power supply, such as a driver, a ballast, a transformer, a step down converter, or a rectifier, can be attached to the ceiling or within a plenum space behind the ceiling to which the luminaire 100 is attached. The power supply can also be located within a mounting box that can be attached to the mounting structure. The power supply can comprise class 1 connections (e.g., 120V AC, 220V AC) for receiving power from a power source, such as the electrical power grid or a renewable power source. The power supply can modify the power received from the power source and can comprise low voltage connections (e.g. class 2 connections, 24V DC) for coupling to the cables that suspend the luminaire 100. The cables suspending the luminaire can deliver the low voltage power from the power supply to the one or more LEDs. As another alternative where the cable or other attachment mechanisms suspending the luminaire 100 do not deliver power, a separate low voltage power cable can deliver power from the power supply to the LEDs of the luminaire 100.

While the example luminaire 100 shown in FIGS. 1 and 2 comprises 6 light modules mounted parallel to each other, it should be understood that in other embodiments fewer or more light modules can be used in the luminaire. For example, if more or less light is needed in an area, the number of light modules attached to the rails 102 and 104 can be increased or decreased. In certain example embodiments, only a single light module may be used in the luminaire. Additionally, the light modules of the luminaire can be configured in patterns other than parallel.

Figure 3:
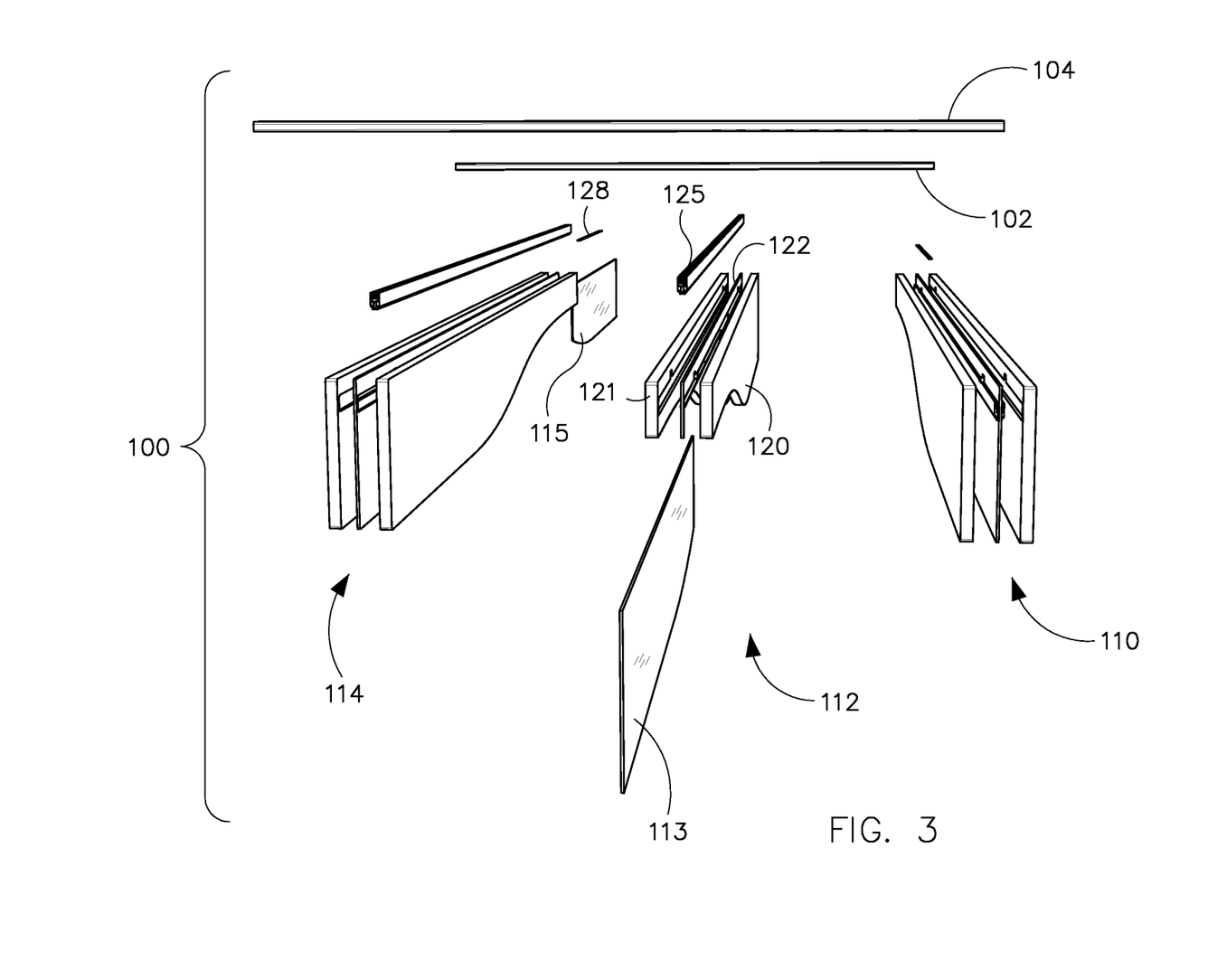
FIG. 3 is an exploded partial view of the suspended luminaire in accordance with an example embodiment of the disclosure.
Figure 4:
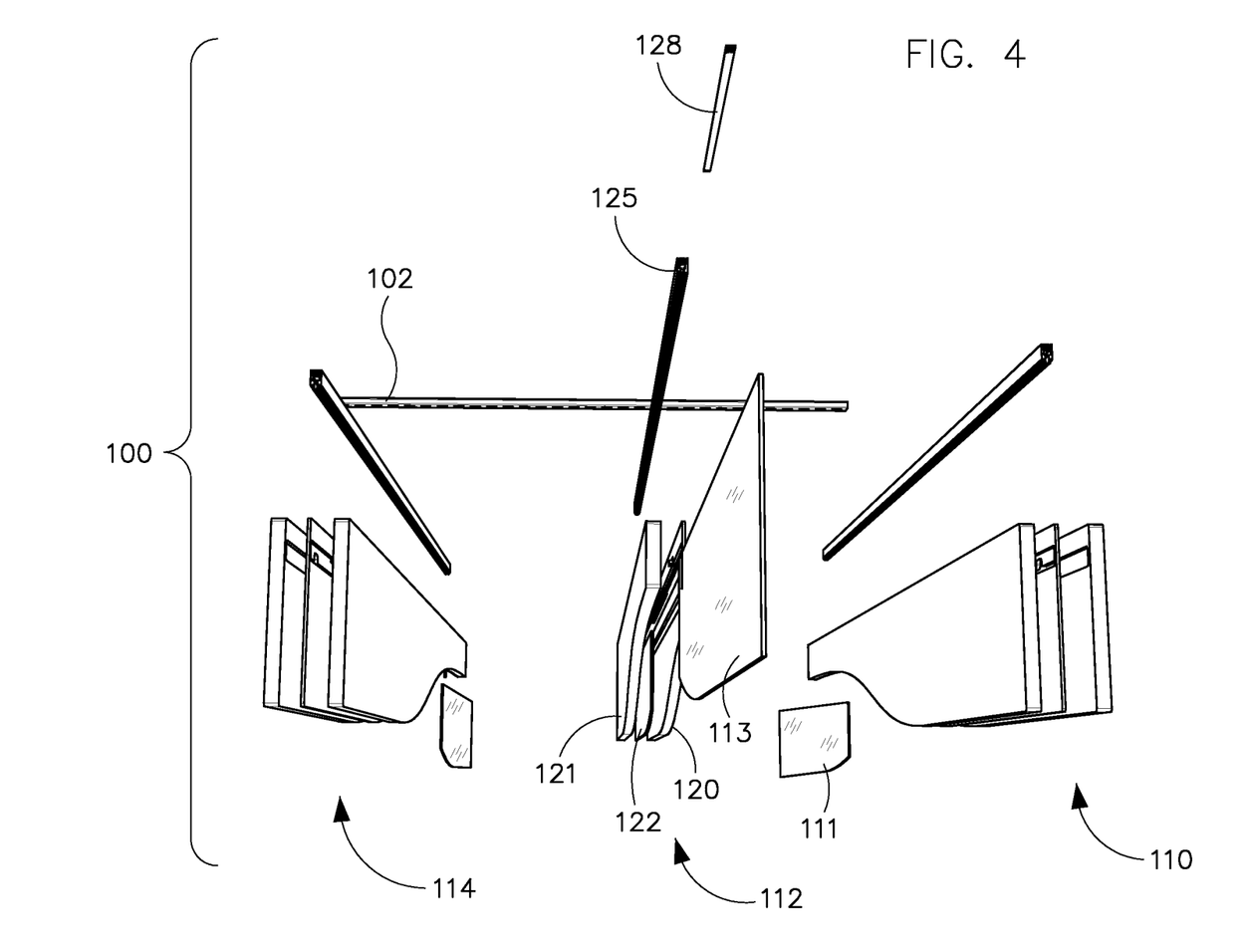
FIG. 4 is another exploded partial view of the suspended luminaire in accordance with an example embodiment of the disclosure.

FIGS. 3 and 4 provide exploded partial views of the components of the luminaire 100 in greater detail. As shown in FIGS. 3 and 4, each light module comprises several components. The following description of the several components of an example light module can apply to each light module of the luminaire. Referencing light module 112 as an example, the light module comprises a first acoustic panel 120 and a second acoustic panel 121. As shown in FIG. 1, each light module of example luminaire 100 has a length 140, a height 142, and a thickness 144. Along the length 140 of the light module 112, the height of the first acoustic panel 120 and the second acoustic panel 121 varies from a wide portion that completely covers the broad sides of the lightguide to a narrow portion that exposes a portion of the broad sides of the lightguide. In other words, the first acoustic panel 120 has a first wide portion and a first narrow portion. Similarly, the second acoustic panel 121 has a second wide portion and a second narrow portion. As shown in the figures, a portion of the lightguide is exposed and extends from the light module 112 adjacent the first narrow portion of acoustic panel 120 and the second narrow portion of acoustic panel 121. The lightguide 113 is disposed between the first acoustic panel 120 and the second acoustic panel 121 and at least one edge of the lightguide 113 is secured by a frame 125 which is also located between the first acoustic panel 120 and the second acoustic panel 121.

In alternate embodiments, the acoustic panels can have other shapes or configurations. For instance, example luminaire 100 is arranged so that the narrow portions of the acoustic panels in one light module are at one side of the luminaire 100, while the next light module has the narrow portions of the luminaire at the opposite side of the luminaire 100. The result of this alternating pattern is that the lightguides are exposed on alternating sides of the luminaire 100 moving from one light module to the next. In alternate embodiments of the luminaire, the exposed portion of the lightguide can differ from that shown in luminaire 100. For instance, in one embodiment, the height of each acoustic panel can be constant along the length of the acoustic panel so that a uniform portion of the lightguide is exposed along the length of the light module.

The first and second acoustic panels 120 and 121 can absorb sound which can be beneficial in large open areas or areas with significant noise. The acoustic panels can be made from one or more of a variety of materials known to be effective for absorbing sound such as foam, cork, felt, various polymers such as polyethylene terephthalate, or other porous materials. The acoustic panels can comprise multiple layers of differing materials and the layers can be joined by any one of a variety of means including adhesives, fasteners, or thermoforming processes. The inner, outer, or both the inner and outer surfaces of the acoustic panels also can have three-dimensional patterns or features (e.g. ribs, protrusions, textures) that can increase the acoustic panels effectiveness at absorbing sound. In alternate embodiments, the first and second acoustic panels 120 and 121 can have different shapes or can have multiple wide portions as well as multiple narrow portions from which a lightguide extends. In alternate embodiments, the lightguide can also have different shapes.

The light module 112 also comprises an optional filler panel 122 disposed between the first and second acoustic panels 120 and 121. Because the lightguide 113 does not extend the entire length of the first and second acoustic panels 120 and 121, the optional filler panel 122 fills the gap between the first and second acoustic panels 120 and 121 for the remaining length of the light module 112 where there is no lightguide 113. In alternate embodiments, the light module 112 can be formed without the optional filler panel 122. The optional filler panel 122 can be constructed with the same material as the first and second acoustic panels or an alternate material.

The exploded views in FIGS. 3 and 4 also show an LED array 128 that is disposed within the frame 125. The LED array 128 can be mounted to a circuit board and the circuit board can be electrically coupled to the low voltage power cable that was previously described. Alternatively, in the example where the suspension cables also deliver power to the luminaire 100, the circuit board can be electrically coupled to the suspension cables. In certain embodiments, it can be beneficial if the rails 102 and 104 and/or the frame 125 are made from an electrically insulating material such as a plastic. The LED array 128 can be positioned adjacent to a narrow edge of the lightguide 113 so that light emitted from the LED array 128 is directed into the narrow edge of the lightguide 113. Illumination light can exit the lightguide 113 from one or both of the broad side surfaces of the lightguide 113. In certain embodiments, the narrow edges of the lightguide 113 that are exposed from the light module 112 can be covered with a reflective material or a diffusing material.

Figure 5:
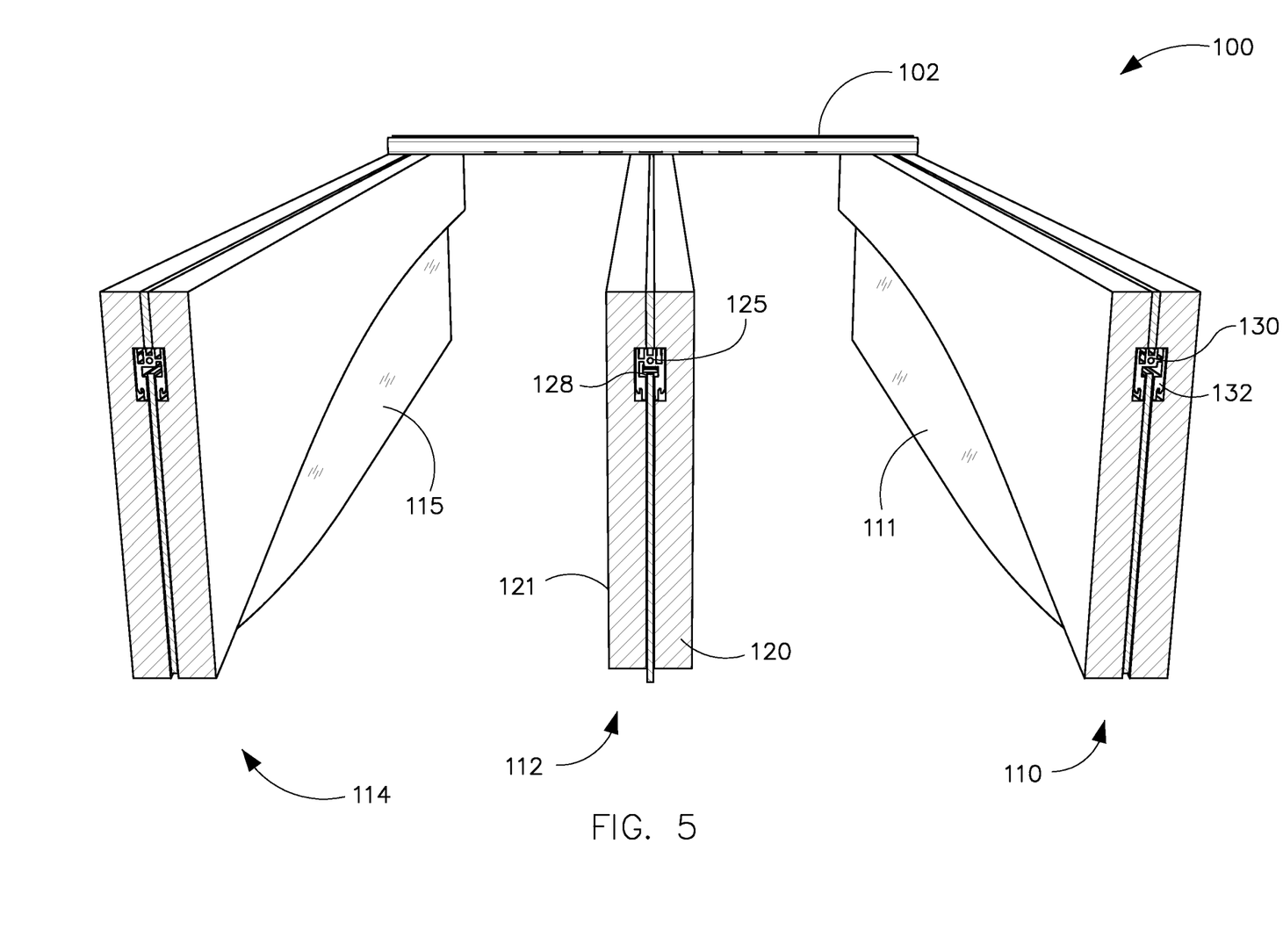
FIG. 5 is a cross-sectional partial view of the suspended luminaire in accordance with an example embodiment of the disclosure.

FIG. 5 provide a cross-sectional view of a portion of the luminaire 100. As illustrated in FIG. 5, while the orientation of the six light modules is alternating with the exposed lightguide at alternating ends of the luminaire, the cross-sectional composition of each light module is generally consistent. Referencing light module 112 as an example, the first acoustic panel 120 and the second acoustic panel 121 can be joined using an adhesive or any of a variety of mechanical fasteners. The lightguide can be seen sandwiched between the first acoustic panel 120 and the second acoustic panel 121. Also visible in the cross-section are frame 125 and the LED array 128 disposed within the frame and adjacent a long edge of the lightguide. Similarly, the lightguide 111, frame 130 and LED array 132 can be seen in light module 110.

In alternate examples, instead of the first and second acoustic panels, the light module can comprise a single acoustic panel housing with a slot into which the lightguide is placed. Similar to the previously described separate acoustic panels, the acoustic panel housing can be made from sound absorbing materials. The acoustic panel housing can be a single component instead of separate acoustic panels. Alternatively, the acoustic panel housing may be composed of different materials, wherein a sound absorbing material or pattern is placed on the outside of the acoustic panel housing. Additionally, in alternate examples the lightguide can be positioned in different locations along the acoustic panel or may extend from multiple locations along the acoustic panel.

As referenced above, the suspended luminaire described herein provides several benefits. When powered on, the LEDs of the light module can direct light into the lightguide and illumination light can exit one or both of the broad side surfaces of the lightguide as well as, optionally, the narrow edges of the lightguide that are exposed outside the light module. The suspended luminaire 100 provides a further benefit in that the acoustic panels can absorb unwanted noise in the area where the luminaire is installed. In alternate embodiments, the acoustic panels can have other shapes or positions to modify the effectiveness of their sound absorption characteristics.

Representative embodiments have been described herein with reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Any example luminaires, or components thereof, described herein can be made from a single piece (e.g., as from a mold, injection mold, die cast, 3-D printing process, extrusion process, stamping process, or other prototype methods). In addition, or in the alternative, an example luminaire (or components thereof) can be made from multiple pieces that are mechanically coupled to each other. In such a case, the multiple pieces can be mechanically coupled to each other using one or more of a number of coupling methods, including but not limited to epoxy, welding, soldering, etching, fastening devices, compression fittings, mating threads, tabs, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting, or other similar terms. Such terms are merely meant to distinguish various elements and/or features within a component or device and are not meant to limit the capability or function of that particular element and/or feature. For example, a feature described as a "coupling feature" can couple, secure, fasten, abut, and/or perform other functions aside from merely coupling.

A coupling feature (including a complementary coupling feature) as described herein can allow one or more components and/or portions of an example luminaire to become coupled, directly or indirectly, to another portion of the example luminaire and/or some external component (e.g., a wall, a ceiling). A coupling feature can include, but is not limited to, a snap, a clamp, a portion of a hinge, an aperture, a recessed area, a protrusion, a slot, a spring clip, a tab, a detent, and mating threads. One portion of an example luminaire can be coupled to another component of the example luminaire or an external component by the direct use of one or more coupling features.

In addition, or in the alternative, a portion of an example luminaire can be coupled to another portion of the luminaire or another component using one or more independent devices that interact with one or more coupling features disposed on the example luminaire. Examples of such devices can include, but are not limited to, a pin, a hinge, a fastening device (e.g., a bolt, a screw, a rivet), epoxy, a sealing member (e.g., an O-ring, a gasket), glue, adhesive, tape, and a spring. One coupling feature described herein can be the same as, or different than, one or more other coupling features described herein. A complementary coupling feature (also sometimes called a corresponding coupling feature) as described herein can be a coupling feature that mechanically couples, directly or indirectly, with another coupling feature.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:
   a first acoustic panel having a first wide portion and a first narrow portion;
   a second acoustic panel having a second wide portion and a second narrow portion;
   a lightguide located between the first acoustic panel and the second acoustic panel, the lightguide extending from the first acoustic panel adjacent the first narrow portion and extending from the second acoustic panel adjacent the second narrow portion;
   a frame disposed between the first acoustic panel and the second acoustic panel, the frame securing the lightguide; and
   one or more light emitting diodes (LEDs) attached to the frame and adjacent to an edge of the lightguide, the one or more LEDs oriented to emit light into the edge of the lightguide.

2. The luminaire of claim 1, wherein the first acoustic panel and the second acoustic panel are coupled to at least one rail.

3. The luminaire of claim 2, wherein the luminaire is configured to be suspended by the at least one rail.

4. The luminaire of claim 2, wherein a first light module comprises the first acoustic panel, the second acoustic panel, the lightguide, and the frame, and wherein the first light module is one of a plurality of light modules attached to the rail.

5. The luminaire of claim 4, wherein the plurality of light modules are arranged in parallel.

6. The luminaire of claim 1, further comprising a filler panel.

7. The luminaire of claim 6, wherein the filler panel is disposed between the first acoustic panel and the second acoustic panel adjacent to the first wide portion and the second wide portion.

8. The luminaire of claim 6, wherein the filler panel is made of a same material as the first acoustic panel and the second acoustic panel.

9. The luminaire of claim 1, wherein the one or more light emitting diodes are electrically coupled to a low voltage power cable.

10. The luminaire of claim 9, wherein the low voltage power cable is configured to be coupled to a power supply.

11. The luminaire of claim 10, wherein the power supply is configured to be disposed within a ceiling.

12. The luminaire of claim 1, wherein the first acoustic panel and the second acoustic panel comprise one or more of cork, felt, foam, and polyethylene terephthalate.

13. The luminaire of claim 1, wherein at least one of the first acoustic panel and the second acoustic panel comprise protrusions extending from an outer surface.

14. The luminaire of claim 1, wherein the lightguide comprises a second edge opposite the edge, wherein the second edge is covered with a diffuser.

15. The luminaire of claim 1, wherein the lightguide comprises a second edge opposite the edge, wherein the second edge is covered with a reflector.

16. A luminaire comprising:
    an acoustic panel housing having a slot;
    a lightguide located in the slot of the acoustic panel housing and extending from the acoustic panel housing;
    a frame disposed within the acoustic panel housing, the frame securing the lightguide within the acoustic panel housing; and
    one or more light emitting diodes (LEDs) attached to the frame and adjacent to an edge of the lightguide, the one or more LEDs oriented to emit light into the edge of the lightguide.

17. The luminaire of claim 16, wherein the acoustic panel housing comprises one or more of cork, felt, foam, and polyethylene terephthalate.

18. The luminaire of claim 16, wherein the acoustic panel housing has a wide portion and a narrow portion, the lightguide extending from the acoustic panel housing adjacent the narrow portion.

19. The luminaire of claim 16, wherein the lightguide comprises a second edge opposite the edge, wherein the second edge is covered with one of a diffuser and a reflector.

20. The luminaire of claim 16, wherein the acoustic panel housing is attached to at least one rail, the at least one rail configured to be suspended from a mounting structure.

\* \* \* \* \*